Aug. 1, 1950      W. H. RUDISILL      2,517,135
ELECTRIC GENERATING SYSTEM

Filed Aug. 15, 1947      7 Sheets-Sheet 1

INVENTOR.
WESLEY H. RUDISILL
BY
ATTORNEYS

Aug. 1, 1950  W. H. RUDISILL  2,517,135
ELECTRIC GENERATING SYSTEM
Filed Aug. 15, 1947  7 Sheets-Sheet 2
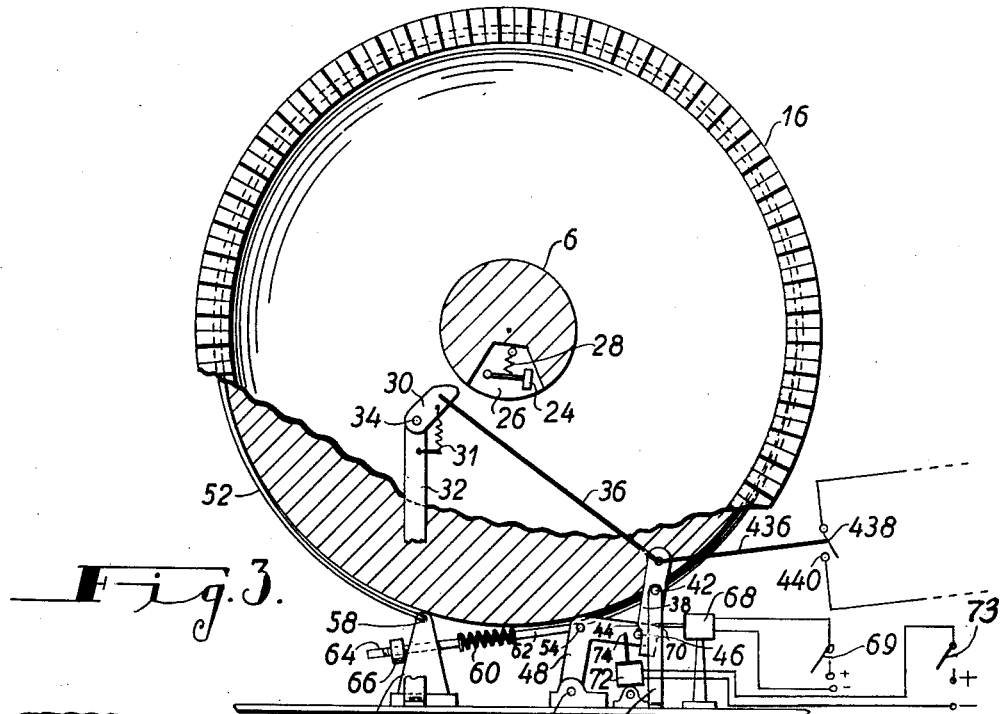
Fig. 3.
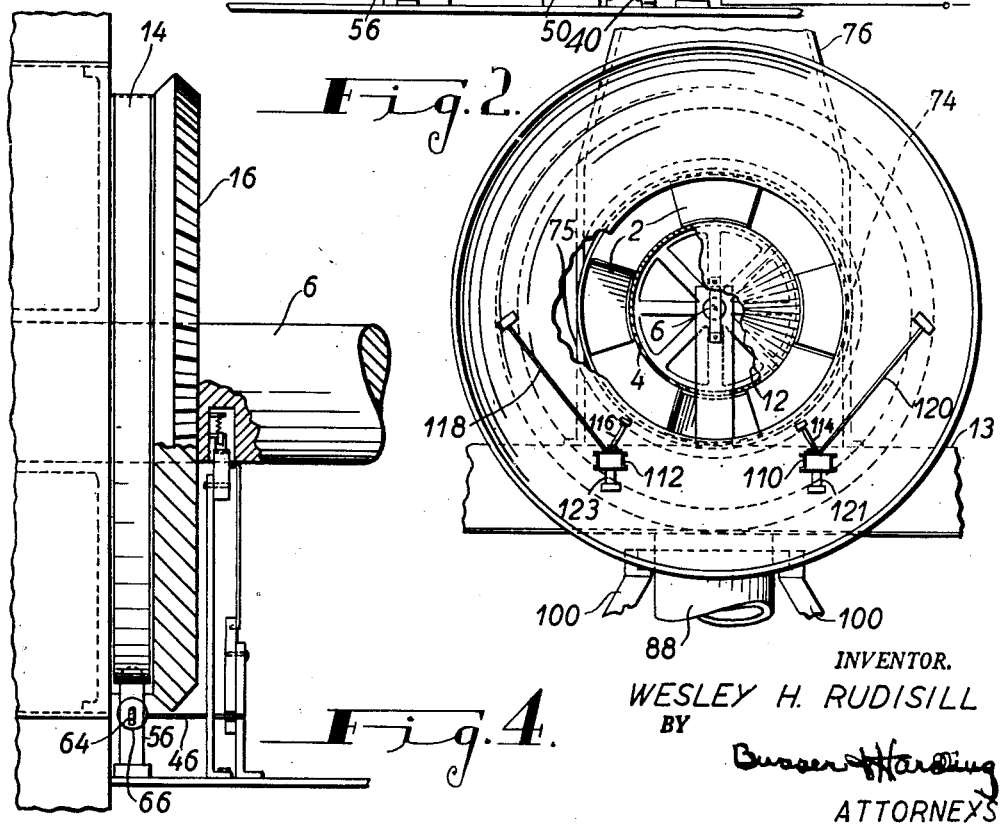
Fig. 2.
Fig. 4.
INVENTOR.
WESLEY H. RUDISILL
BY
ATTORNEYS

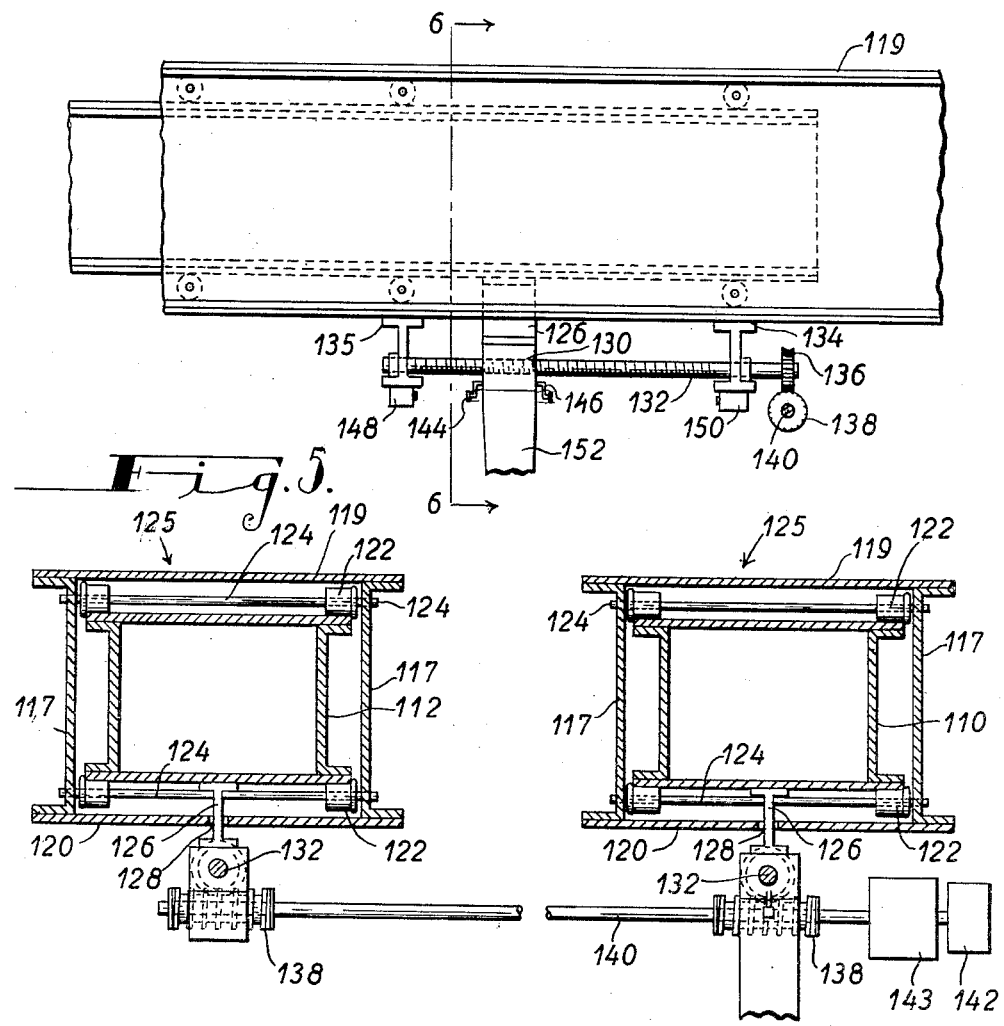

Aug. 1, 1950 W. H. RUDISILL 2,517,135
ELECTRIC GENERATING SYSTEM
Filed Aug. 15, 1947 7 Sheets-Sheet 4

INVENTOR.
WESLEY H. RUDISILL
BY
Busser Harding
ATTORNEYS

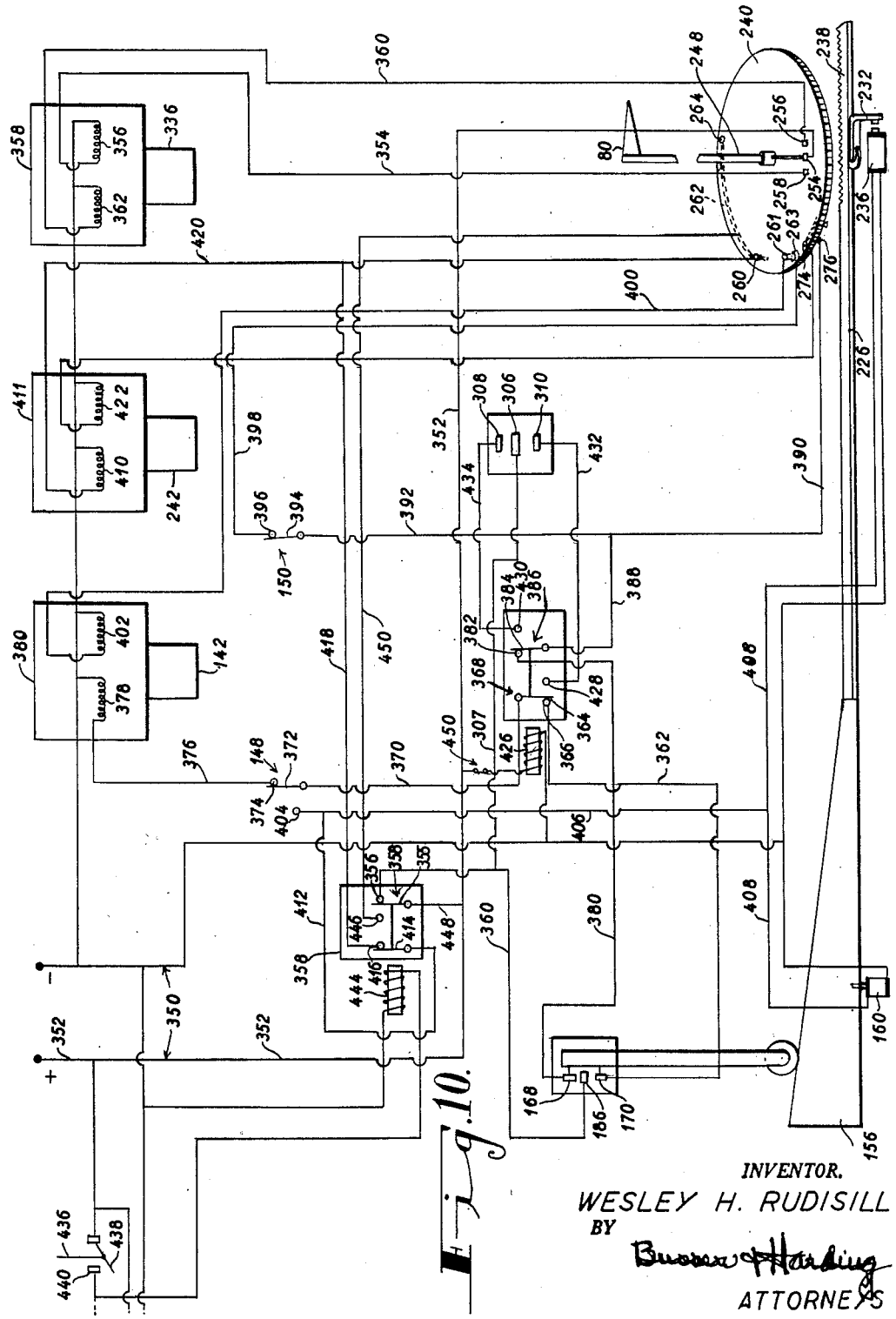

Aug. 1, 1950   W. H. RUDISILL   2,517,135
ELECTRIC GENERATING SYSTEM
Filed Aug. 15, 1947   7 Sheets-Sheet 6

INVENTOR.
WESLEY H. RUDISILL
BY
ATTORNEYS

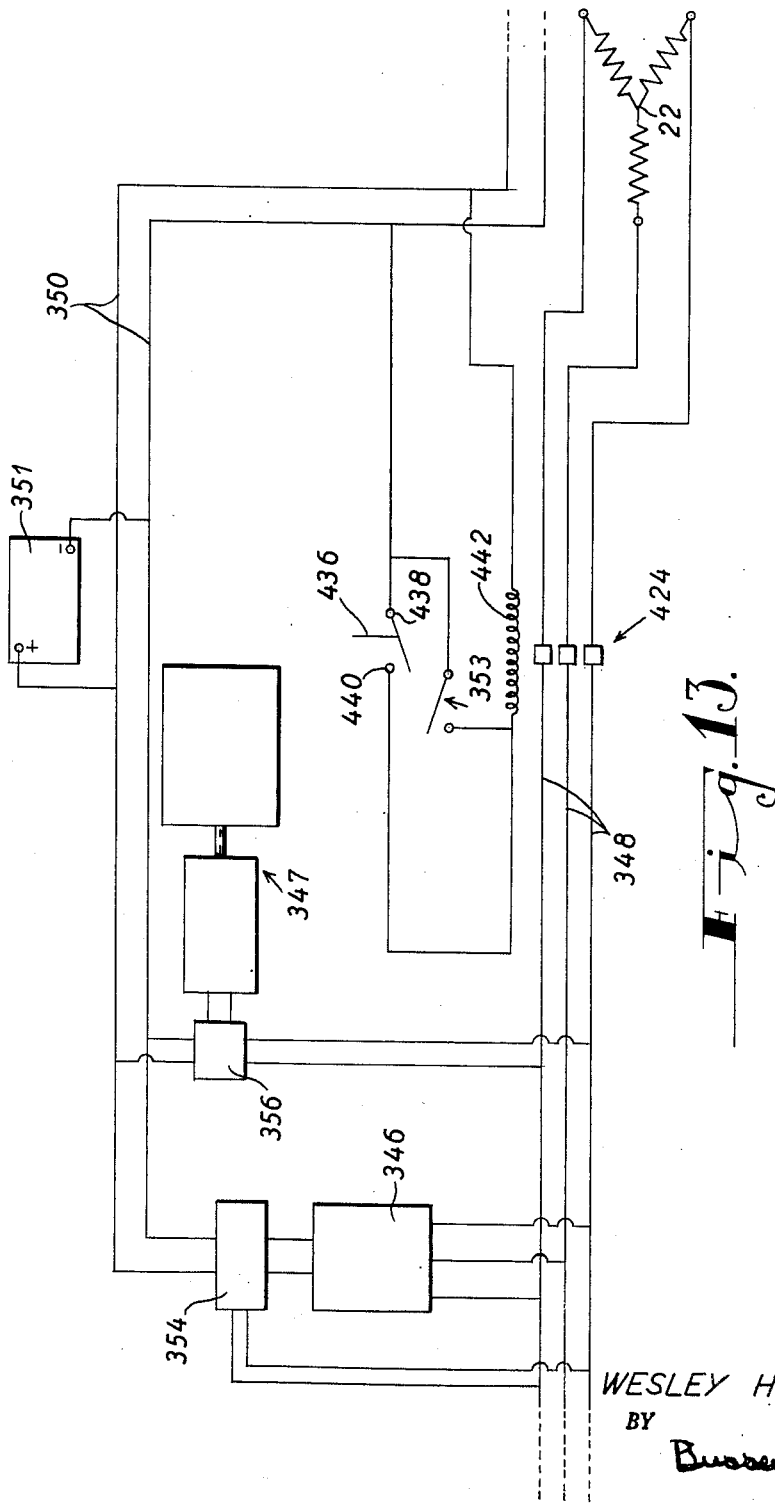

Patented Aug. 1, 1950

2,517,135

UNITED STATES PATENT OFFICE 2,517,135

ELECTRIC GENERATING SYSTEM

Wesley H. Rudisill, Philadelphia, Pa.

Application August 15, 1947, Serial No. 768,909

8 Claims. (Cl. 290—44)

This invention relates to the generation of electric energy by the utilization of the power of the wind. More particularly, it relates to a generator driven by a wind-driven turbine and means for controlling and regulating the turbine.

It is well known that the wind is an excellent source of energy and numerous attempts have been made to use this energy for the generation of electric power. Due to the numerous problems involved, very little practical success has heretofore been achieved. The principal difficulties result from the varying velocity of the wind. Thus, when the velocity is low, it is necessary to keep the turbine facing directly into the wind at all times in order to derive the maximum amount of energy from the wind. When the velocity of the wind gets so high that the turbine will develop more power than the equipment will stand with safety, means must be provided to lessen the effect of the wind on the turbine. Further, whenever the speed of the turbine becomes excessive due to lack of load such as might be caused by an electric generator or transmission line failure, means for automatically stopping the unit must be provided.

To date, the solution of these problems in a satisfactory manner has not been achieved. No suitable means have been found for taking care of the varying wind velocities without involving a great sacrifice in the operating efficiency under conditions of either low or high wind velocity. Means for utilizing all the wind energy within the capacity of the wind turbine through a large range of wind velocities have not heretofore been practical.

An object of this invention is, therefore, to provide a wind power generating which utilizes the maximum amount of wind energy when the velocity of the wind is such that the turbine cannot fully load the generator.

An object of this invention is to provide a wind power generating device provided with means permitting operation under high wind velocity conditions without overloading the generator.

An object of this invention is to provide a wind power generating device having adjustable deflection means to control the wind energy delivered to the turbine.

Another object of this invention is to provide a wind power generating device having means whereby the wind turbine may be turned partially out of the wind in order to reduce the delivery of wind energy to the turbine.

Another object of this invention is to provide a wind power generating device with means for turning and keeping the turbine out of the wind and stopping the rotation of the turbine under conditions of excessive wind velocity or breakdown.

This and other objects of the invention will become apparent from the following description, read in conjunction with the accompanying drawings, in which:

Figure 2 is a front view of the wind turbine and deflector;

Figure 3 is a rear view of the brake mechanism;

Figure 4 is a side view of the brake mechanism;

Figure 5 is a side view showing a boom and its housing;

Figure 7:
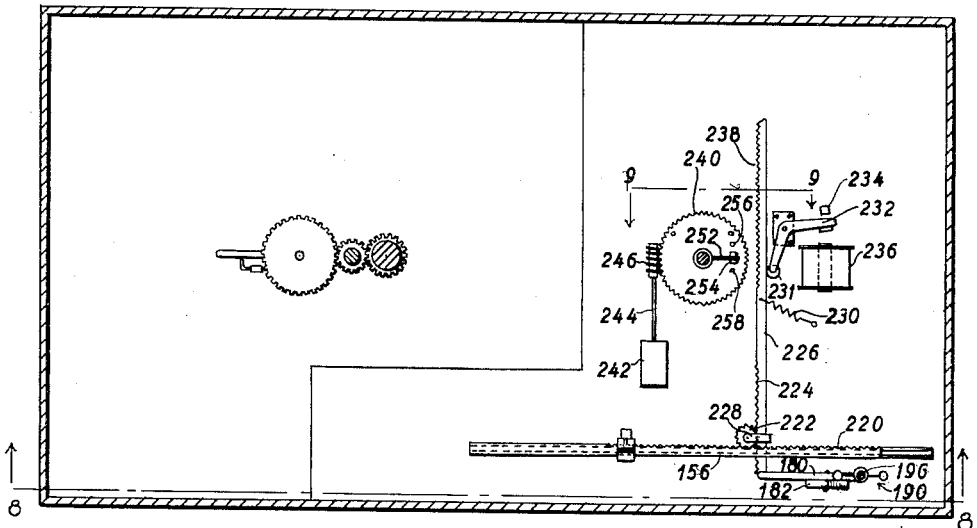
Figure 8:
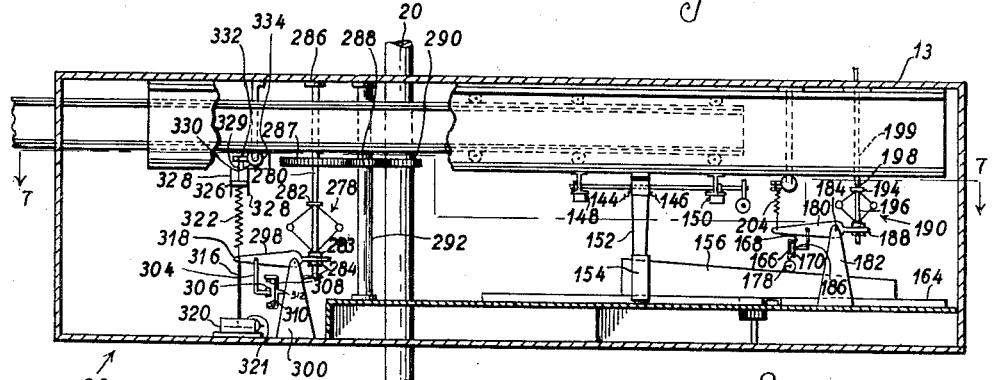
Figure 9:
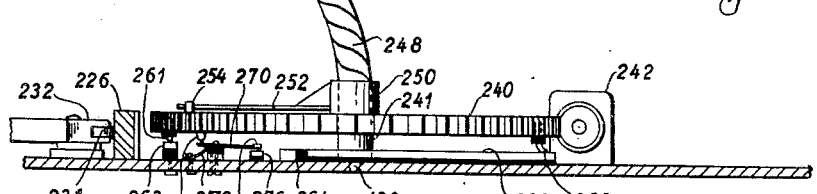
Figure 12:
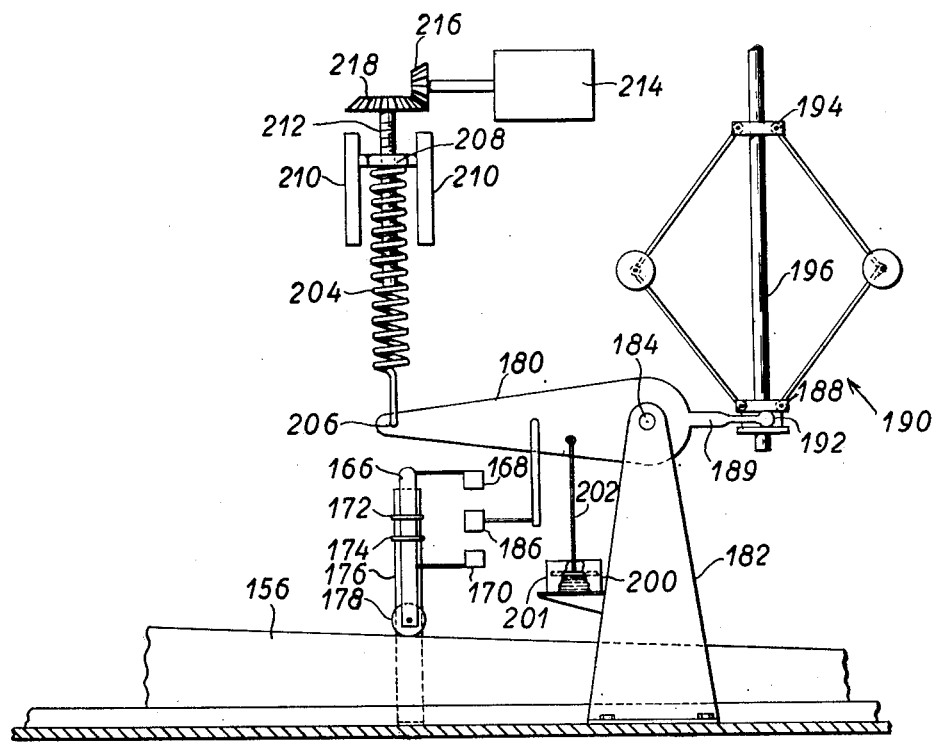
Figure 11:
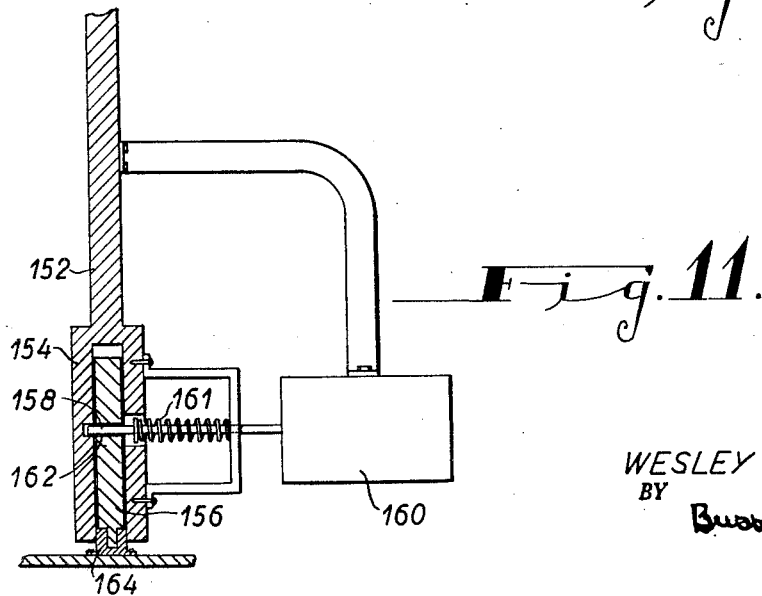

Figure 6 consists of a vertical section on the plane 6—6 of Figure 5 through the booms and associated mechanism;

Figure 7 is a horizontal section on the plane indicated at 7—7 in Figure 8 showing certain control units in plan;

Figure 8 is a vertical section showing the control units in elevation;

Figure 9 is a vertical section showing the control gear and its associated contacts, the section being taken on the plane 9—9 in Figure 7;

Figure 10 is a wiring diagram showing electrical connections of the control mechanism;

Figure 11 is a sectional view of the connections between the inclined plane and its arm;

Figure 12 is an enlarged sectional view of the wind controlled governor and its associated mechanism; and Figure 13 is a wiring diagram illustrating certain control connections.

Figure 1:
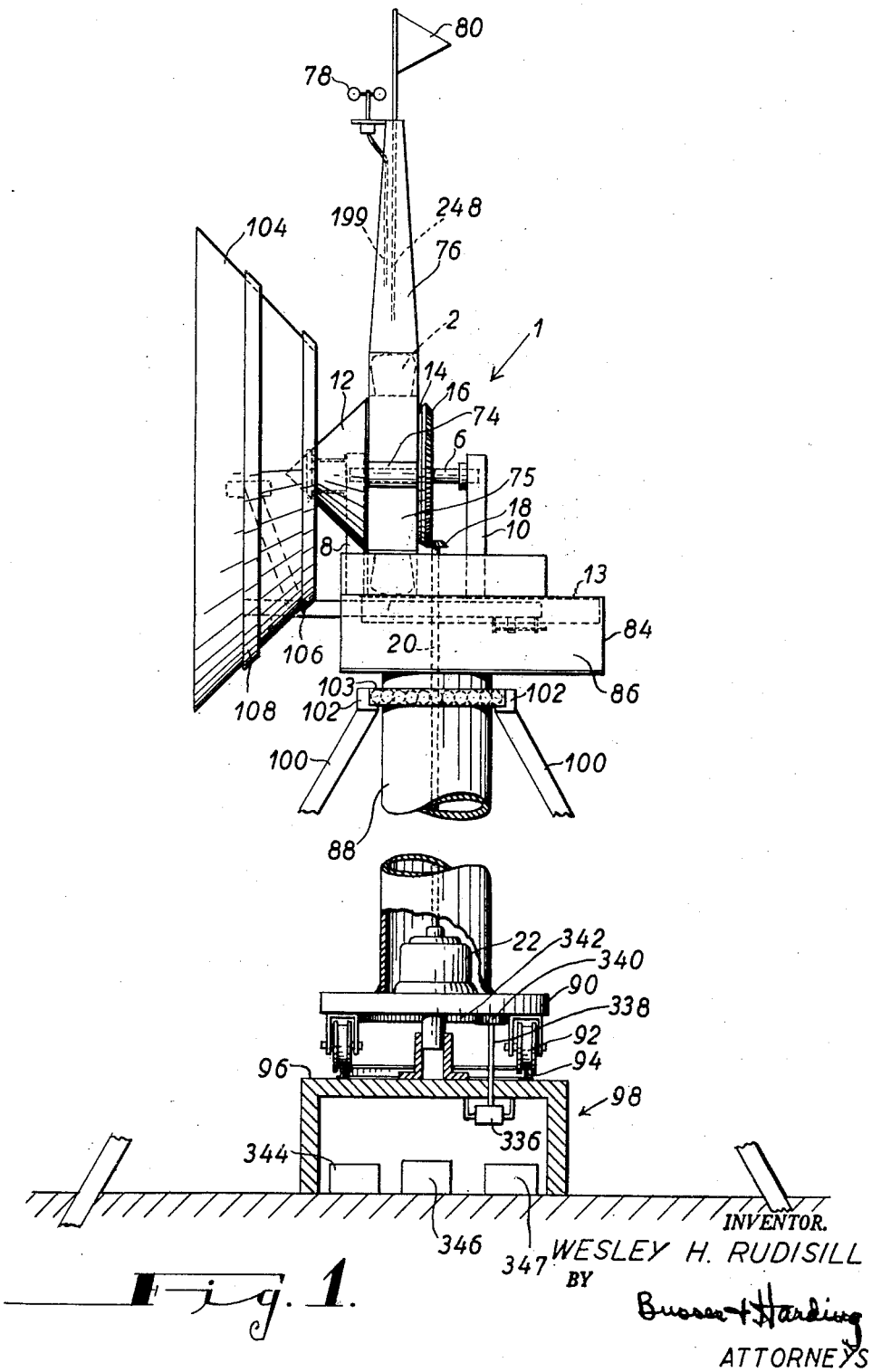
Figure 1 is a side elevation of the wind turbine device, partly in section to show certain details.

A wind turbine 1 (Figure 1) of conventional type comprises blades 2 carried by a wheel 4 which is fixedly secured to a shaft 6. The shaft 6 is rotatably mounted in thrust bearings at its opposite ends in supports 8 and 10 which are secured to a platform 13.

Fixedly secured to the support 8 is a coneshaped hub 12. A brake drum 14 is secured to the rear face of wheel 4 and carries bevel gear 16. Pinion gear 18 meshes with bevel gear 16 and is fixedly secured to shaft 20 which drives the alternating current generator 22.

A trip hammer 24 (Figures 3 and 4) is located in a recess 26 in shaft 6 and is biased inwardly by spring 28. A lever 30 is pivotally mounted on support 32 at 34 and connected by rod 36 to lever 38 which in turn is pivotally mounted on support 40 at 42. Lever 30 is biased downwardly by a spring 31. Lever 38 has a shoulder 44 which is adapted to engage a rod 46 fixedly secured to a bent lever 48 which is pivotally mounted at 50. Brake band 52 is secured to lever 48 at 54 and to support 56 at 58.

Tension spring 60 is fixedly secured to bar 62 which is pivotally secured to bent lever 48 at 54. Rod 64 is secured to spring 60 and passes through support 56. A nut 66 threaded to the rod 64 provides for adjustment of the tension of spring 60. A solenoid 68 is secured to the lever 38 at 70 in such a manner that it can operate the lever 38 so as to release rod 46 from shoulder 44. The solenoid 68 may be remotely operated by switch 69. An electromagnetic brake reset device 72 may be connected to bent lever 48 at 74 and operated by a switch 73 located at a remote point.

A circular housing 74 (Figure 1) is constructed around the wind turbine 1. The housing 74 is supported by platform 13 and supports 75. This housing has a diameter slightly larger than the diameter of the wind turbine and forms a wind tunnel. This housing 74 supports a tower 76 on which an anemometer 78 and a metal wind direction pennant 80 are rotatably mounted.

Platform 13 is supported by the side walls 84 of compartment 86 which has a floor supported on tube 88. Tube 88 is secured to platform 90 which is mounted on wheels 92 which run on a circular track 94 located on the roof 96 of house 98. Struts 100 support ring 102. Ring 103 is fixedly secured to tube 88 and is ball-bearing mounted for rotation within ring 102.

An air deflector 104 (Figures 1 and 2) having the shape of a hollow truncated cone has reinforcing rings 106 and 108. Ring 106 is fixedly secured to booms 110 and 112 by braces 114 and 116. Struts 118 and 120 are secured to ring 108 through deflector 104 and are fixedly secured to booms 110 and 112, respectively. Members 121 and 123 form an additional connection between the booms and ring 108.

Booms 110 and 112 are telescoped within housings shown generally at 125 (Figure 6). The housings 125 are formed by sidewalls 117, top members 119 and floor members 120. The booms 110 and 112 are carried between rollers 122 which are rotatably mounted above and below the booms 110 and 112 on rods 124. Booms 110 and 112 have secured to their lower faces brackets 126 which pass through slots 128 in the floor members 120. Fixedly secured to brackets 126 are travelling nuts 130 which are threaded on the shafts 132 which are mounted in brackets 134 and 135 secured to the lower face of floor member 120. The shafts 132 carry gears 136 which mesh with worm gears 138 carried by the shaft 140 which is driven by a motor 142 through reduction gears 143.

Travelling nut 130 on the boom 110 carries projections 144 and 146 (Figure 5) which actuate switches 148 and 150, respectively.

Compartment 86 (Figures 7 and 8) contains the majority of the elements of the control system which are shown in Figures 7, 8 and 9. Arm 152 is fixedly secured to the nut 130 of boom 110 and has a fork-shaped portion 154 at its lower end which fits over an inclined plane member 156. A plunger 158 actuated by a solenoid 160 is biased by spring 161 so as to engage aperture 162 in the inclined plane member 156 to lock the arm 152 to the inclined plane 156 as shown in Figure 11.

The inclined plane 156 is mounted in a grooved guide 164. Rod 166 carries contacts 168 and 170 and is slidably held by collars 172 and 174 mounted on bracket 176. A wheel 178 secured to the lower end of rod 166 rests on the inclined plane 156. (Figures 8 and 12.)

Arm 180 is pivotally attached to a stand 182 at 184 and carries contact 186 which is adapted to make with either contact 168 or 170. Movable ring 188 of a governor 190 coacts with forked end 189 of arm 180 and 192. Ring 194 of governor 190 is fixedly secured to shaft 196. At 198 shaft 196 is connected to a flexible shaft 199 which is, in turn, connected to the anemometer 78. A plunger 200 in a liquid dampening pot 201 is secured to the arm 180 by rod 202.

A coil spring 204 is secured to the arm 180 at 206 and to a nut 208. Vertical guides 210 prevent the nut 208 from turning when shaft 212 on which it is threaded is rotated by reversible motor 214 through gears 216 and 218.

Teeth 220 on inclined plane 156 (Figure 7) mesh with pinion gear 222 which in turn meshes with teeth 224 cut in rack 226. Rack 226 is held in contact with pinion gear 222 by a pivoting strap 228 secured to gear 222.

Spring 230 biases rack 226 against wheel 231 of bell crank 232 which in turn rests against stop 234. Solenoid 236 is adapted to attract bell crank 232 to force the teeth 238 of rack 226 into mesh with gear 240.

Control gear 240 is rotatably mounted on member 241. Motor 242 is connected to gear 240 by shaft 244 and gear 246.

Flexible shaft 248 (Figure 9) is secured at one end to wind pennant 80 and at the other end to collar 250, to which is secured a contact arm 252 carrying contact 254 which lies between and is adapted to make with either contact 256 or 258 which are secured to and insulated from the top face of gear 240. These elements are so aligned that when the turbine is facing directly into the wind, contact 254 will lie midway between contacts 256 and 258 if the gear 240 is in its normal position as described below. When in this position, the arm 252 lies on the fore and aft centerline of compartment 86.

Contact 261 is secured to and insulated from the lower face of gear 240 and makes with contact 263. This is the normal position of gear 240. Contact 260 is insulated from and secured to the lower face of gear 240. When gear 240 is in its normal position contact 260 makes with the counterclockwise end of strip contact 262 which is in the form of a circular arc and adapted to make with contact 260 for 90° of rotation clockwise from the normal position of gear 240. At the clockwise end of strip contact 262 is a block 264 of insulating material.

Knob 268, which is made of insulating material and is secured to the lower face of gear 240, holds switch lever 270 in a position against spring 272 so that the contact 274 which is secured to the end of, and is insulated from, lever 270 will not make with contact 276 when the gear 240 is in the normal position.

Governor 278 (Figure 8) is mounted on shaft 280 by fixed ring 282 and movable ring 283. Shaft 280 is supported by bearings 284 and 286 and has a gear 287 which meshes with gear 288 which in turn meshes with gear 290 which is fixedly secured to shaft 20. Gear 288 is secured to shaft 292.

Arm 298 is pivotally mounted on stand 300. Contact arm 304 is secured to arm 298 and is adapted to carry contact 306 between contacts 308 and 310 so that it can make either of them. Contacts 308 and 310 are carried by and insulated from bracket 312 which is secured to stand 300. Arm 298 coacts with movable ring 283 of governor 278. Rod 316 secured to arm 298 at 318 connects arm 298 to a plunger 320 in dampening pot 321.

A coil spring 322 is secured to arm 298 and to nut 326. Vertical guides 328 prevent the nut 326 from rotating when shaft 329, to which it is threaded, is rotated by a reversible motor 330 through gears 332 and 334.

Motor 336 (Figure 1) is secured to the underside of roof 96 and drives through reduction gearing shaft 338 which, through gear 340, is connected to gear 342, secured to the underside of platform 90.

House 98 in addition contains a storage battery 344, a motor generator 346 and a gasoline driven D. C. generator 347.

The construction and operation of the control circuits shown in Figures 10 and 13 will be best understood by considering an exemplary set of design and wind conditions. Assume that the generator 22 is delivering its energy into a system network 348 in which there are other generators driven by steam and in parallel with the generator 22. Assume also that frequency control is vested in some other generator in the system. In addition, let us assume the following design conditions:

(a) At wind velocities of less than 4 M. P. H. the generator will motor and draw sufficient energy from the electrical system to run at synchronous speed.

(b) At wind velocities of between 4 M. P. H. and 15 M. P. H. the generator will be partially loaded.

(c) At 15 M. P. H. power input from the wind into the generator will fully load the generator if the turbine is facing directly into the wind and deflector 104 is supplying the turbine with the maximum amount of air.

(d) At velocities above 15 M. P. H. and up to 50 M. P. H. the movement of deflector 104 can control the effect of the wind on the wheel so that the generator will be fully loaded but not overloaded.

As shown in Figure 13, motor generator 346 is connected to system network 348 and delivers direct current to control supply circuit 350 which has a storage battery 351 connected to it in parallel. In case of a power failure in network 348 relay 354 cuts motor generator 346 out of control supply circuit 350 and relay 356 cuts in and starts up gasoline driven D. C. generator 347 to supply control supply circuit 350 in a conventional manner.

Line 352 of supply circuit 350 (Figure 10) is connected to contact 254 on arm 252. A slight shift in the wind causes the pennant 80 to rotate thus causing contact 254 to make with either control 256 or 258. If the wind moves clockwise, say from north towards east, contact 254 makes contact 258 and through line 354 energizes relay coil 356 in reversing control 358 which controls motor 336. Motor 336 is thereby caused to drive shaft 338 (Figure 1), gear 340 and through gear 342 causing platform 90 to rotate clockwise which results in compartment 86 being rotated. Thus gear 240 which is locked in position by motor 242 in compartment 86 is moved clockwise until contact between 254 and 258 is broken at which point the turbine blades will again be facing directly into the wind. It will be apparent that if the wind shifts in a counterclockwise direction, the pennant 80 will move counterclockwise causing contact 254 to make with contact 256 thus energizing line 360 and coil 362 of reversing control 358 causing motor 336 to drive platform 90 in a counterclockwise direction causing gear 240 to move in a counterclockwise direction until contact 256 between contact 254 is broken at which point the turbine blades 2 will again be facing into the wind.

If the wind velocity is less than 15 M. P. H., the booms 110 and 112 will be fully housed and the deflector 104 will be providing the maximum amount of wind to the turbine blades 2. With the deflector 104 in this position, the turbine facing directly into the wind and a wind velocity of 15 M. P. H., the generator 22 will be fully loaded.

When the velocity of the wind increases above 15 M. P. H. to say 20 M. P. H., the anemometer 78 through flexible shaft 199 causes the ring 188 of governor 190 to be raised causing arm 180 to pivot and bring contact 186 into contact with contact 170. This completes a series circuit from line 352 of supply circuit 350 through relay arm 355 and contact 356 of relay 358, line 360, contact 186, contact 170, line 362, contact 366 and relay arm 364 of relay 368, line 370, knife blade 372 and contact 374 of switch 148, and line 376 to coil 378 of reversing control switch 380 which controls motor 142. This causes motor 142 to drive shaft 140, gears 138 and 136, shafts 132 and move nuts 130 in such direction that the booms 110 and 112 are moved outwardly carrying deflector 104 away from turbine 2 (Figure 6).

As the nut 130 on boom 110 moves boom 110 out, it carries with it arm 152 which is locked to inclined plane 156 by plunger 158. Thus inclined plane 156 is moved to the left looking at Figure 8 which permits wheel 178 and rod 166 to move downwardly until contact 170 is moved out of contact with contact 186 which, of course, deenergizes coil 378 causing motor 142 to stop. It will be apparent that the slope of inclined plane 156 is selected so that the motor 142 is caused to stop at the point where the turbine blades 2 are being provided with sufficient wind to operate the generator 22 at its fully loaded condition.

Should the velocity of the wind now decrease to say 18 M. P. H., the speed of rotation of governor 190 will decrease resulting in a lowering of ring 188 and a resultant raising of contact 186 to a position where it makes with contact 168. This makes a series circuit from line 360 through contact 186, contact 168, line 380, contact 382 and relay arm 384 of relay 386, line 388, line 390 leading to contact 276 which is not in contact with contact 274 since gear 240 is in the normal position, line 392, knife 394 and contact 396 of switch 150 (which were engaged when the boom 110 moved out of the fully housed position and switch operating lever 149 was carried outwardly by nut 130), line 398, contact 263, contact 261 and line 400 to coil 402 of reversing control switch 380 which causes motor 142 to drive so as to move the booms 110 and 112 inwardly causing the deflector 104 to move inwardly and supply the blades 2 with more wind. At the same time, the inclined plane as seen in Figure 8 is being moved to the right by arm 152 causing contact 168 to be raised. When the generator 22 is again fully loaded, the contact between contacts 186 and 168 will be broken stopping the movement of deflector 104.

When the velocity of the wind reaches 50 M. P. H., the generator 22 will be fully loaded and the deflector 104 will be in the fully extended position. Projection 144 on the nut 130 attached to boom 110 will have caused knife 372 of switch 148 to have been thrown from contact 374 to contact 404.

Now if the velocity of the wind exceeds 50 M. P. H., governor 190 will act to lower contact 186 into contact with contact 170. As we have seen above, this energizes knife blade 372 of switch 148. Since blade 372 is now in contact with contact 404 which is connected to solenoids 236 and 160 through lines 406 and 408, the solenoids 236 and 160 are energized. Solenoid 236 forces the teeth 238 into mesh with gear 240 while solenoid 160 disengages plunger 158 from the inclined plane 156 thus separating arm 152 from the inclined plane.

In addition, coil 410 of reversing motor control 411 is energized through the series circuit from contact 404 through line 412, relay arm 414 and contact 416 of relay 359, line 418 and line 420. The control 411 causes motor 242 (Figure 7) to drive shaft 244 and gear 246 in such a direction that gear 240 is driven clockwise breaking contacts 261 and 263 and making contacts 274 and 276.

Gear 240 as it rotates carries contact 256 against contact 254 energizing coil 362 and causing motor 336 to rotate platform 90 counterclockwise resulting in turning the blades 2 out of the wind.

Further, the gear 240 moves rack 226 towards gear 222 which causes gear 222 to rotate clockwise, thus moving the inclined plane so as to lower contact 170 until it no longer is in contact with governor controlled contact 186 at the point when the generator 22 is just fully loaded.

Should the wind decrease from 60 M. P. H. to say 55 M. P. H., governor 190 will cause contact 186 to make with contact 168 and causing, as we have seen, contact 276 to be energized. Since blade 270 now connects contacts 274 and 276, coil 422 is energized causing motor 242 to rotate gear 240 counterclockwise and contact 258 makes contact 254 energizing coil 356 causing platform 90 to rotate clockwise and the blades 2 to be turned more into the wind. Rack 226 through gear 22 moves inclined plane 256 so that contact 168 is raised up and at the point where the generator 22 is fully loaded it breaks with contact 186.

When the wind velocity drops to 50 M. P. H., gear 240 will be in the normal position, that is, with contact 261 making contact 263 and contact 274 and contact 276 broken. If the velocity of the wind then falls further, contact 186 will make contact 168 causing, as we have already seen, motor 142 to move the booms 110 and 112 inwardly. Since projection 144 is moved from switch 148, knife 372 will be shifted by a biasing spring from contact 404 to contact 374 resulting in the deenergization of solenoids 160 and 236 (Figures 7, 10 and 11). Thus arm 152 will be reconnected to inclined plane 156 by plunger 158 and teeth 238 will be disengaged from gear 240. Control by the deflector 104 is thus fully restored.

If the wind velocity is less than 4 M. P. H., the generator 22 will motor. Under such conditions, the generator may be cut out of system network 348 and permitted to run under field by magnetic switch 442 (Figure 13) which may be controlled manually from a remote station by switch 353 or automatically by a governor controlled switch.

Should it be desirable to have the wind generating unit take over the frequency control, this may be accomplished by opening switch 450 (Figure 10) which deenergizes coil 426 of relay 368 which gives governor 278 control instead of governor 190 by throwing relay arm 364 to contact 428 and relay arm 384 to contact 430.

When the generator 22 is at a speed above synchronous speed, governor 278 pivots arm 298 lowering arm 304 and contact 306 to bring it into contact with contact 310 (Figures 8 and 10). Contact 306 is energized by line 307 which is connected to line 360. Through line 432, contact 428 and relay arm 364, line 370 is energized which, as we have seen before, results in motor 142 driving and deflector 104 moving outwardly. When synchronous speed is reached, the governor raises contact 306 so that it no longer makes with contact 310 thus stopping the movement of the deflector 104. When the generator is below synchronous speed, the reverse operation occurs. Contact 306 makes contact 308 and line 388 is energized through line 434, contact 430 and relay arm 384. This, as we have seen above, results in the energizing of coil 402 and causes the motor 142 to move deflector 104 inwardly. This increases the speed of the generator 22, and, when it arrives at synchronous speed, governor 278 will cause contact 306 to break from contact 308.

In the event that the speed of rotation of blades 2 exceeds a safety limit, hammer 24 (Figure 3) will, due to centrifugal force, overcome the force of spring 28 and move outwardly sufficiently to strike lever 30 and force it counterclockwise against the action of spring 31. This causes rod 36 to move link 38 counterclockwise, disengaging the bar 46 from shoulder 44. This permits spring 60 to pull bell crank 48 counterclockwise and thus clamp brake band 52 to brake drum 14 and stop the rotation of shaft 6 and turbine 1. The brake mechanism may also be actuated by pivoting lever 38 by means of a solenoid 68, operated remotely.

When lever 38 of the brake mechanism is actuated, it carries with it rod 436 which brings knife 438 into contact with contact 440 and energizes coil 442 of magnetic switch 424 (Figure 13) thus disconnecting the generator 22 from the system 348.

In addition, as shown in Figure 10, closing knife blade 438 energizes coil 444 which causes knife 354 to make contact 446 and knife blade 414 to break contact with contact 416.

Coil 410 is energized by the series circuit formed by line 352, line 448, relay arm 354, contact 446, line 450, strip contact 262, contact 260 and line 420. This causes motor 242 to drive gear 240 clockwise resulting, as we have seen above, in motor 336 turning the blades 2 out of the wind due to the operation of contacts 256 and 254. This turning will continue until contact 260 rides onto the insulated block 264 which breaks the connection between strip 262 and contact 260 and thus stops motor 242. Since strip contact 262 is 90° in extent, the blades 2 will have been turned 90° out of the wind and it will be apparent that through the operation of the pennant 80, arm 252, contacts 254, 256 and 258 that they will be maintained in a position 90° from the direction of the wind.

Adjustment of the effect of the governor 190 may be controlled by the amount of displacement of coil spring 204 (Figure 12). If motor 214 is operated so as to cause nut 208 to move downwardly, the spring 204 will be compressed and will tend to aid the centrifugal action of the governor. This, in turn, would cause contact 186 to be located at a lower position for a given wind velocity and, as we have seen above, this would cause the deflector 104 to be positioned closer to the turbine so as to supply it with more air. Thus if we had a wind of 19 M. P. H. and the generator was not quite fully loaded we would adjust spring 204 as shown above until it was fully loaded. The spring 322 operates in a similar manner with arm 298 and governor 278 (Figure 8).

It should be noted that this invention is not limited to the specific embodiment illustrated since it will be apparent that numerous modifications may be made without exceeding the scope of the invention.

What I claim and desire to protect by Letters Patent is:

1. In an electric generating system, a wind turbine, a generator driven by the turbine, deflecting means for controlling the flow of air to the turbine, means responsive to wind velocity to control said deflecting means to prevent overloading the generator until the wind reaches a predetermined velocity, means for changing the direction in which the turbine faces, and means responsive to wind velocity for controlling said direction changing means which become operative when the wind reaches said predetermined velocity to prevent overloading the generator.

2. In an electric generating system, a wind turbine, a generator driven by the turbine, deflecting means for controlling the flow of air to the turbine, means responsive to wind velocity to control said deflecting means to prevent overloading the generator until the wind reaches a predetermined velocity, means for changing the direction in which the turbine faces, means responsive to wind velocity for controlling said direction changing means which become operative when the wind reaches said predetermined velocity to prevent overloading the generator, and braking means for stopping the rotation of the turbine.

3. In an electric generating system, a wind turbine, a generator driven by the turbine, deflecting means for controlling the flow of air to the turbine, means responsive to wind velocity to control said deflecting means to prevent overloading the generator until the wind reaches a predetermined velocity, means for changing the direction in which the turbine faces, means responsive to wind velocity for controlling said direction changing means which become operative when the wind reaches said predetermined velocity to prevent overloading the generator, braking means for stopping the rotation of the turbine, and means for turning and maintaining the turbine out of the wind.

4. In an electric generating system, a wind turbine, a generator driven by the turbine, deflecting means for controlling the flow of air to the turbine, means responsive to the turbine speed to control said deflecting means so that the turbine will run the generator at synchronous speed until the wind reaches a predetermined velocity, means for changing the direction in which the turbine faces, and means responsive to the turbine speed for controlling said direction changing means which become operative at said predetermined velocity to keep the turbine running the generator at synchronous speed.

5. In an electric generating system, a wind turbine, a generator driven by the turbine, deflecting means for controlling the flow of air to the turbine, means responsive to the turbine speed to control said deflecting means so that the turbine will run the generator at synchronous speed until the wind reaches a predetermined velocity, means for changing the direction in which the turbine faces, means responsive to the turbine speed for controlling said direction changing means which become operative at said predetermined velocity to keep the turbine running the generator at synchronous speed, and braking means whereby the rotation of the turbine may be stopped.

6. In an electric generating system, a wind turbine, a generator driven by the turbine, deflecting means for controlling the flow of air to the turbine, means responsive to the turbine speed to control said deflecting means so that the turbine will run the generator at synchronous speed until the wind reaches a predetermined velocity, means for changing the direction in which the turbine faces, means responsive to the turbine speed for controlling said direction changing means which become operative at said predetermined velocity to keep the turbine running the generator at synchronous speed, braking means whereby the rotation of the turbine may be stopped, and means for turning and maintaining the turbine out of the wind.

7. In an electric generating system, a wind turbine, a generator driven by the turbine, deflecting means for controlling the flow of air to the turbine, means responsive to wind velocity to control said deflecting means to prevent overloading the generator until the wind reaches a predetermined velocity, means for changing the direction in which the turbine faces, means responsive to wind direction for controlling said direction changing means to keep the turbine facing into the wind until the wind reaches said predetermined velocity, and means responsive to wind velocity for controlling said direction changing means which become operative when the wind reaches said predetermined velocity to prevent overloading the generator.

8. In an electric generating system, a wind turbine, a generator driven by the turbine, deflecting means for controlling the flow of air to the turbine, means responsive to the turbine speed to control said deflecting means so that the turbine will run the generator at synchronous speed until the wind reaches a predetermined velocity, means for changing the direction in which the turbine faces, means responsive to wind direction for controlling said direction changing means to keep the turbine facing into the wind until the wind reaches said predetermined velocity, and means responsive to the turbine speed for controlling said direction changing means which become operative at said predetermined velocity to keep the turbine running the generator at synchronous speed.

WESLEY H. RUDISILL.

REFERENCES CITED

The following references are of record in the file of this patent:

UNITED STATES PATENTS

| Number | Name | Date |
|---|---|---|
| 766,219 | Clemson | Aug. 2, 1904 |
| 1,125,783 | Waters | Jan. 19, 1915 |
| 1,646,723 | Bonetto | Oct. 25, 1927 |
| 1,677,745 | Bonetto | July 17, 1928 |
| 1,806,628 | Hunt | May 26, 1931 |
| 1,816,632 | Bucklen | July 28, 1931 |
| 2,106,557 | Putnam | Jan. 25, 1938 |
| 2,148,804 | Claytor | Feb. 28, 1939 |
| 2,159,886 | Cullin | May 23, 1939 |
| 2,179,885 | Fumagalli | Nov. 14, 1939 |
| 2,360,792 | Putnam | Oct. 17, 1944 |
| 2,363,850 | Bany | Nov. 28, 1944 |